Oct. 11, 1927.

F. J. CID 1,645,278

ELECTRIC WATER HEATER

Filed Aug. 3, 1926

2 Sheets-Sheet 1

INVENTOR.
Fouad Jean Cid,
BY
Hood + Hahn.
ATTORNEYS

Oct. 11, 1927. 1,645,278
F. J. CID
ELECTRIC WATER HEATER
Filed Aug. 3, 1926　　2 Sheets-Sheet 2

INVENTOR.
Fouad Jean Cid,
BY
Hood & Hahn.
ATTORNEYS

Patented Oct. 11, 1927.

1,645,278

UNITED STATES PATENT OFFICE.

FOUAD JEAN CID, OF INDIANAPOLIS, INDIANA.

ELECTRIC WATER HEATER.

Application filed August 3, 1926. Serial No. 126,947.

The object of my invention is to produce an efficient electrical water heater by means of which a flowing stream of water may be heated as it passes through the heating device. Provision is made for automatically breaking the electrical circuit upon attainment of a desired maximum of heat; for automatically making the circuit upon initiation of flow of water through the apparatus; and for readily associating the heating unit with an ordinary water faucet, such as is commonly found at a wash basin or at a kitchen sink.

The accompanying drawings illustrate my invention.

Figure 1:
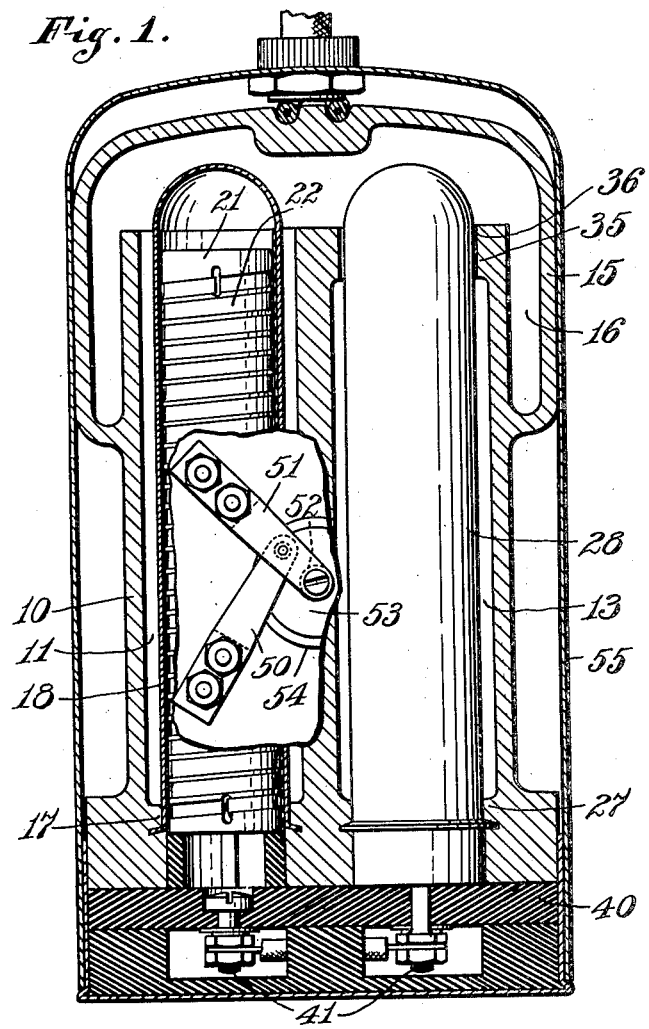
Figure 2:
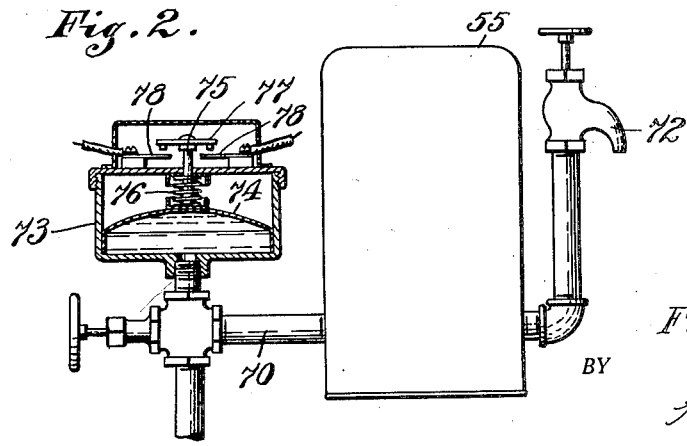
Figure 5:
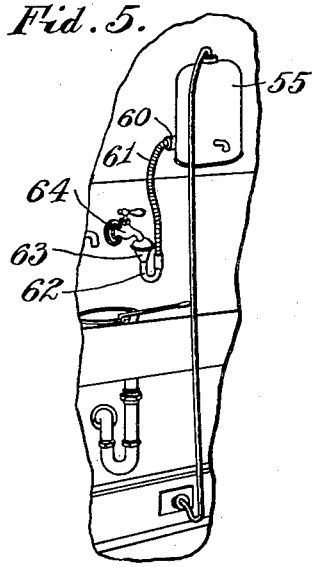
Figure 3:
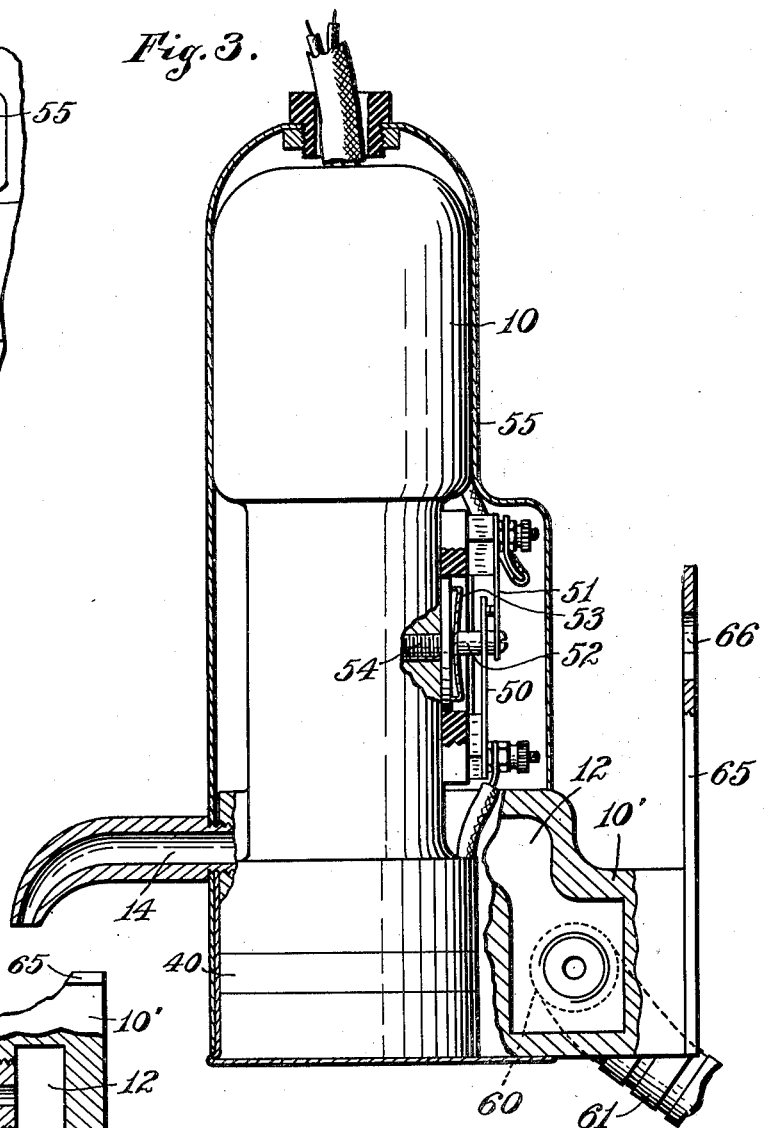
Figure 4:
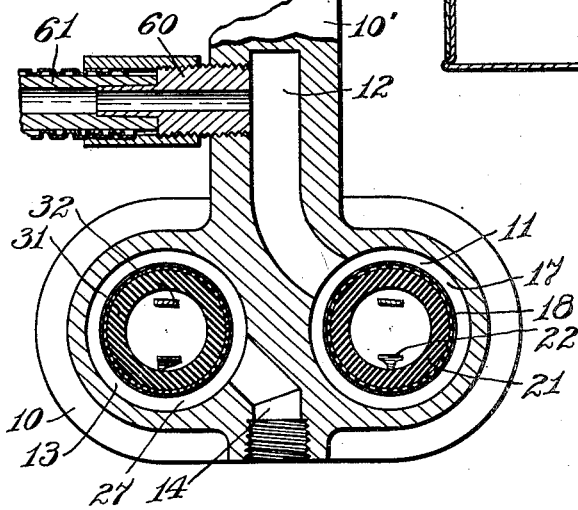

Fig. 1 is an axial section of a small unit embodying my invention;

Fig. 2 a vertical section of the pressure controlled switch in the supply circuit of a heater shown in elevation;

Fig. 3 a side elevation in partial vertical section of the device shown in Fig. 1;

Fig. 4 a section through the outlet and inlet passages of the structures shown in Figs. 1 and 2; and Fig. 5 a perspective view showing the manner of association of my heater with an existing water faucet.

In the drawings 10 indicates a hollow main body, conveniently a casting, having a cylindrical passage 11, communicating at its lower end with an inlet passage 12; a cylindrical passage 13 communicating at its lower end with an outlet passage 14; and a jacket 15 which forms a water space 16 surrounding the upper part of the main body 10 and a connection between the upper ends of the passages 11 and 13.

At the lower end of passage 11 is an inwardly projecting annular flange 17 into which is cast the lower flared end of a copper tube 18.

The tube 18 has a closed upper end which projects beyond the upper end of passage 11 and lies within chamber 16. Within tube 18 is an insulating core 21 upon which is arranged a spiral electrical heating element 22 the ends of which are carried through ring 20.

At the lower end of passage 13 is an annular flange 27 into which is cast the flared end of a copper tube 28. Tube 28 projects up through passage 13 and its closed end lies in chamber 16. Mounted in tube 28 is an insulating core 31 carrying a heating element 32.

At the upper end of passage 13 is an inwardly projecting annular flange 35, the inner diameter of which is slightly greater than the external diameter of tube 28, the arrangement being such that a substantially constricted passage 36 is formed between chamber 16 and passage 13 around tube 28.

Cores 21 and 31 are held in place by plate 40 which carries terminal pins 41 to which the heating elements 22 are connected so that they may be included in an electrical circuit.

In order that said circuit may be automatically broken when the temperature of the apparatus reaches a desired maximum, I include in said circuit a pair of spring terminals 50 and 51 which are suitably mounted upon the main body 10. Terminal 51 is provided with a foot 52 which rests upon the buckling wall 53 of thermostatic capsule 54 secured to body 10. This capsule is filled with an expansible material. When cold wall 53 is collapsed as shown in Fig. 3, and when heated, the expansion of the material causes wall 53 to suddenly buckle in the opposite direction and thus suddenly separate terminal 51 from terminal 50.

Main body 10 and the automatic thermostatic switch are conveniently enclosed in a metal shell 55 formed to slip readily over the parts as shown in Fig. 3. The inlet passage 12 is provided with a receiving nipple 60 to which is detachably secured one end of a flexible hose 61, the opposite end connecting with a goose-neck fitting 62 provided at its free end with a rubber socket 63 which may be readily slipped upon the faucet 64.

The inlet passage 12 is formed within a block 10' integral with the main body 10 and provided with a plate 65 suitably perforated at 66 to facilitate hanging of the structure upon the wall.

In Fig. 2 I show a slight modification in which the heater is installed as a permanent structure, supply pipe 70 leading into the inlet passage 12 and faucet 72 being connected with the outlet passage 14.

Associated with the inlet pipe 70 is a pressure capsule 73, similar in construction and operation to the thermostatic capsule 54, the wall 74 being normally buckled outwardly under the normal pressure within the supply pipe 70. Resting upon wall 74 is a switch-carrying plunger 75 normally urged to the capsule by spring 76. Plunger 75 carried a switch element 77 cooperating with terminals 78 which are in the supply circuit of the heating elements. Under normal conditions faucet 72 flows to supply pressure will expand the capsule wall 74 so as to separate the supply circuit terminals. When valve 72 is open the supply pressure will drop and spring 76 will cause wall 74 to buckle to collapsed position, thus permitting the supply circuit terminals to contact.

I claim as my invention:

1. A water heater comprising a main body having two cylindrical passages, an inlet passage leading into one end of one of said passages, an outlet passage leading from one end of the other of said passages, a water chamber forming communication between adjacent ends of the two passages, a metal tube lying within each of said cylindrical passages and spaced from the walls thereof, and an electrical heating element within each of said tubes, the passage which is connected with the outlet passage being so formed as to provide a short restricted connection between the water chamber and the outlet cylindrical passage.

2. A water heater comprising a main body having two cylindrical passages, an inlet passage leading into one end of one of said passages, an outlet passage leading from one end of the other of said passages, a water chamber forming a communication between adjacent ends of the two passages and jacketing a portion of the main body, a metal tube lying within each of said cylindrical passages and spaced from the walls thereof, and an electrical heating element within each of said tubes, the passage which is connected with the outlet passage being so formed as to provide a short restricted connection between the water chamber and the outlet cylindrical passage.

3. A water heater comprising a main body and having a cylindrical passage, an inlet passage leading into one end of said cylindrical passage, a water chamber communicating with the opposite end of said cylindrical passage and an outlet leading from said chamber, a metal tube lying within said cylindrical passage and having a closed end projected into the water chamber beyond the cylindrical passage, said tube forming, in conjunction with the cylindrical passage, a restricted annular passage between the inlet and outlet, and an electrical heating element arranged within and insulated from the metal tube.

4. A water heater comprising a main body having two cylindrical passages, an inlet passage leading into one end of said passages, an outlet passage leading from one end of the other of said passages, a water chamber forming communication between adjacent ends of the two passages, a metal tube having a closed end lying within each of said cylindrical passages and slightly spaced from the walls thereof, the closed ends of said tubes projecting beyond the cylindrical passages into the water chamber, and an electrical heating element within and insulated from each of said tubes.

5. A water heater comprising a main body having two cylindrical passages, an inlet passage leading into one end of one of said passages, an outlet passage leading from one end of the other of said passages, a water chamber forming communication between adjacent ends of the two passages and jacketing an adjacent portion of the main body, a metal tube having a closed end lying within each of said cylindrical passages and slightly spaced from the walls thereof, the closed ends of said tubes projecting beyond the cylindrical passages into the water chamber, and an electrical heating element within and insulated from each of said tubes.

6. A water heater comprising a main body having two cylindrical passages, an inlet passage leading into one end of one of said passages, an outlet passage leading from one end of the other of said passages, a water chamber forming communication between adjacent ends of the two passages, a metal tube having a closed end lying within each of said cylindrical passages and slightly spaced from the walls thereof, the closed ends of said tubes projecting beyond the cylindrical passages into the water chamber, and an electrical heating element within and insulated from each of said tubes, the passage which is connected with the outlet passage being so formed as to provide a short further restricted connection between the water chamber and the outlet cylindrical passage.

7. A water heater comprising a main body having two cylindrical passages, an inlet passage leading into one end of one of said passages, an outlet passage leading from one end of the other of said passages, a water chamber forming communication between adjacent ends of the two passages and jacketing an adjacent portion of the main body, a metal tube having a closed end lying within each of said cylindrical passages and slightly spaced from the walls thereof, the closed ends of said tubes projecting beyond the cylindrical passages into the water chamber, and an electrical heating element within and insulated from each of said tubes, the passage which is connected with the outlet passage being so formed as to provide a short further restricted connection between the water chamber and the outlet cylindrical passage.

In witness whereof, I have hereunto set my hand at Indianapolis, Indiana, this 23rd day of July, A. D. one thousand nine hundred and twenty six.

FOUAD JEAN CID.